US012585135B2

(12) United States Patent
Liang et al.

(10) Patent No.: US 12,585,135 B2
(45) Date of Patent: Mar. 24, 2026

(54) TRANSMITTING-RECEIVING COAXIAL LASER RANGING DEVICE AND OPTICAL MODULE

(71) Applicant: Sinotech Optics Co., Ltd., Chengdu (CN)

(72) Inventors: Guangqu Liang, Chengdu (CN); Fugui Zhang, Chengdu (CN)

(73) Assignee: Sinotech Optics Co., Ltd., Chengdu (CN)

( * ) Notice: Subject to any disclaimer, the term of this patent is extended or adjusted under 35 U.S.C. 154(b) by 382 days.

(21) Appl. No.: 18/143,102

(22) Filed: May 4, 2023

(65) Prior Publication Data

US 2023/0359054 A1 Nov. 9, 2023

(30) Foreign Application Priority Data

May 5, 2022 (CN) .......................... 202221042079.0

(51) Int. Cl.
| | |
|---|---|
| *G02B 27/12* | (2006.01) |
| *G01S 7/481* | (2006.01) |
| *G01S 17/08* | (2006.01) |

(52) U.S. Cl.
CPC .......... *G02B 27/126* (2013.01); *G01S 7/4812* (2013.01); *G01S 17/08* (2013.01); *G02B 2207/117* (2013.01)

(58) Field of Classification Search
CPC ........... G02B 27/126; G02B 2207/117; G01S 7/4812; G01S 17/08
USPC ........................................................ 359/618
See application file for complete search history.

(56) References Cited

FOREIGN PATENT DOCUMENTS

| | | | |
|---|---|---|---|
| CN | 113466209 A | 10/2021 | |
| CN | 113654514 A | 11/2021 | |
| CN | 113865431 A | * 12/2021 | ............... F41G 1/26 |

* cited by examiner

*Primary Examiner* — William Choi
(74) *Attorney, Agent, or Firm* — Bayramoglu Law Offices LLC

(57) ABSTRACT

A transmitting-receiving coaxial laser ranging device and an optical module are provided. The transmitting-receiving coaxial laser ranging device and the optical module optimize the structures and positions of a lens barrel, an objective lens, an ocular lens, an optical module, a laser transmitter, a laser receiver and other parts. The laser transmitter and the laser receiver are disposed on a side of a main optical path, but the objective lens, the ocular lens and two beam splitting prisms in the optical module are disposed on the main optical path. The beam splitting prisms are used to change optical paths of the emitted beam and the received beam, and the emitted beam and the received beam are ensured to be coaxial on the main optical path, such that the target can be aimed at more accurately and distance measurement is more precise, and the user can visually observe the target.

15 Claims, 7 Drawing Sheets

300

300

TRANSMITTING-RECEIVING COAXIAL LASER RANGING DEVICE AND OPTICAL MODULE

CROSS REFERENCE TO THE RELATED APPLICATIONS

This application is based upon and claims priority to Chinese Patent Application No. 202221042079.0, filed on May 5, 2022, the entire contents of which are incorporated herein by reference.

TECHNICAL FIELD

The present disclosure relates to the technical field of optical instruments, specifically, to a transmitting-receiving coaxial laser ranging device and an optical module.

BACKGROUND

The laser ranging device is a measuring instrument combining a viewing lens and a laser rangefinder for observation and measurement. It usually includes a lens barrel, an ocular lens, an objective lens, a laser transmitter, a laser receiver, and a microprocessing module. The microprocessing module is mainly used for laser transmitting-receiving control, ranging data processing, and the like. The light source emitted by the laser transmitter of the laser ranging device is reflected by the target and received by the laser receiver. The microprocessing module calculates the distance between the measuring instrument and the target based on parameters such as the relative position relationship between the laser transmitter and the laser receiver, the time difference between transmitting and receiving, and the like.

The laser ranging devices have been widely used in target lenses of firearms, building measurement, road mapping, outdoor sports survey, and the like, and are usually divided into two categories: monocular laser ranging devices and binocular laser ranging devices. Compared with the binocular laser ranging devices, the monocular laser ranging devices take up less space and is lighter and more portable.

For example, the Chinese Patent Application 202111090519.X entitled "MONOCULAR DISTANCE MEASURING TELESCOPE AND DISTANCE MEASURING IMAGING METHOD" discloses a monocular distance measuring telescope which includes a shell, a telescopic module, a transmitting module, a receiving module, an imaging module and a control module. The telescopic module includes an ocular lens group and an objective lens which are respectively arranged in the telescope barrel of the shell. The objective lens is provided with a notch corresponding to a transmitting lens barrel, and the transmitting lens barrel penetrates the notch. In such technical solutions, on the one hand, the transmitting optical path and the receiving optical path are not coaxial, and there is a certain deviation between the two. This affects the measurement accuracy and is more suitable for optical systems with a small field of view; on the other hand, a notch needs to be provided in the objective lens, thus increasing the processing requirements on the objective lens.

Another Chinese Patent Application 202110824859.4 entitled "REMOTE ZOOM ULTRAVIOLET RAMAN AND FLUORESCENCE SPECTRUM DETECTION MODULE AND SPECTROMETER" discloses a spectrum detection module, including an infrared visible light camera, a distance measurement module, an optical system, a focusing module, an excitation module and a detection module.

The distance measurement module specifically includes a distance measurement laser, a first dichroscope, a semi-transmissive and semi-reflective lens and a detector; the distance measurement laser emits a frequency-modulated pulsed laser after the infrared visible light camera is aimed at a measured object; the frequency-modulated pulsed laser passes the first dichroscope and the ultraviolet light of the frequency-modulated pulsed laser is reflected and irradiated to the measured object; the light reflected from the measured object is divided into two beams after passing the semi-transmissive and semi-reflective coating, one beam is received by the infrared visible light camera and the other beam is received by the detector for calculating the distance information of the measured object. In such technical solutions, the camera must be used for imaging, and the user cannot visually observe the object.

SUMMARY

The present disclosure provides a series of technical solutions different from the structure of the prior art to replace the prior art, specifically, provides a transmitting-receiving coaxial laser ranging device and an optical module. The present disclosure optimizes the structure and position of a lens barrel, an objective lens, an ocular lens, an optical module, a laser transmitter, a laser receiver and other parts. The laser transmitter and the laser receiver are disposed on a side of a main optical path, but the objective lens, the ocular lens and two beam splitting prisms in the optical module are disposed on the main optical path. The beam splitting prisms are used to change optical paths of the emitted beam and the received beam, and the emitted beam and the received beam are ensured to be coaxial on the main optical path, such that the target can be aimed at more accurately and distance measurement is more precise, and the user can visually observe the target.

The present disclosure adopts the following specific technical solutions:

A transmitting-receiving coaxial laser ranging device includes a lens barrel, and an objective lens, an ocular lens, an optical module and a ranging assembly that are mounted on the lens barrel, where the ranging assembly includes a laser transmitter, a laser receiver, and a microprocessing module connected to both the laser transmitter and the laser receiver; the optical module disposed between the objective lens and the ocular lens along a main optical path includes a beam splitting prism group, the beam splitting prism group consists of two beam splitting prisms disposed coaxially along the main optical path, and the two beam splitting prisms respectively correspond to positions of the laser transmitter and the laser receiver disposed on a side of the main optical path.

A laser beam emitted by the laser transmitter is partially refracted by one of the beam splitting prisms and converged into the main optical path and is emitted from the objective lens of the lens barrel, after the emitted laser beam is irradiated on an object surface, a reflected laser beam and an external visible beam enter from an objective lens end of the lens barrel to the other one of the beam splitting prisms along the main optical path, the reflected laser beam is refracted to the laser receiver and received by the laser receiver; and the visible beam for imaging is transmitted through the two beam splitting prisms and imaged on a visual imaging surface in front of the ocular lens.

The beam splitting prism group includes two beam splitting prisms: one of the beam splitting prisms, that is close to the objective lens, refracts and transmits the laser beam in a proportion; the other one of the beam splitting prism, that is away from the objective lens, refracts all but transmits none of the laser beam; and both beam splitting prisms transmit most of the visible light.

The microprocessing module is mainly configured to: control the laser transmitter and the laser receiver, obtain a time difference between transmitting and receiving a same laser beam, and then calculate, with reference to the light speed, a distance between the laser ranging device and the target or a local position on the surface of the to-be-measured object. Usually, the relative position between the laser transmitter and the laser receiver may be ignored for long-distance ranging, but should be considered for shorter-distance ranging or ranging with higher accuracy requirements. Ranging through the laser transmitter, the laser receiver and the ranging module falls with the prior art, the present disclosure does not focus on improvement to this part, and therefore details are not described herein. The present disclosure mainly improves the structure of the optical module and the position relationship between the optical module and the objective lens, the ocular lens, the laser transmitter and the laser receiver, which are described in detail below.

In the laser ranging device provided in the present disclosure, two beam splitting prisms corresponding to the positions of the laser transmitter and the laser receiver are disposed, such that the laser transmitter and the laser receiver are disposed on a side of the main optical path, but the emitting optical path and the receiving optical path are coaxial in the main optical path after refraction by the beam splitting prisms. In this way, the optical quality loss is low in a large field of view larger than 2 degrees, and the laser ranging device can better meet the performance requirements of products featuring a large field of view. Moreover, in the present disclosure, the objective lens, the two beam splitting prisms and the ocular lens are disposed coaxially along the main optical path, such that the user can visually observe the target.

In order to better realize the present disclosure, further, a beam splitting bevel of the beam splitting prism is provided with a beam splitting coating through which the visible beam can be transmitted and the laser beam can be transmitted and reflected. The beam splitting prism disposed at a transmitting end of the laser transmitter is denoted as a first beam splitting prism, and the beam splitting prism disposed at a receiving end of the laser receiver is denoted as a second beam splitting prism; and the objective lens, the first beam splitting prism, the second beam splitting prism, and the ocular lens are sequentially and coaxially disposed along the main optical path, or the objective lens, the second beam splitting prism, the first beam splitting prism, and the ocular lens are sequentially and coaxially disposed along the main optical path.

In order to better realize the present disclosure, further, the beam splitting coating is a semi-transmissive and semi-reflective coating.

In order to better realize the present disclosure, further, a working surface, of the first beam splitting prism, that is away from the laser transmitter is an interference reduction surface for reducing reflected laser beams in the prism; and the interference reduction surface is a frosted surface coated with a flat coating, or the interference reduction surface is a highly transmissive surface disposed at an angle.

In order to better realize the present disclosure, further, the optical module further includes a reversing/zoom/focus lens group disposed coaxially with the beam splitting prism group; and the reversing/zoom/focus lens group includes any one of a reversing prism for erecting images, a zoom lens for zooming, a focus lens for focusing, and a reversing and zoom lens for erecting images and zooming.

Further, the reversing/zoom/focus lens group is disposed between the objective lens and the beam splitting prism group.

Further, the reversing/zoom/focus lens group is disposed between the beam splitting prism group and the ocular lens.

Further, the reversing/zoom/focus lens group is disposed between the two beam splitting prisms of the beam splitting prism group.

In order to better realize the present disclosure, further, the laser ranging device further includes a transparent display disposed coaxially with the beam splitting prism group, and the transparent display is located on the visual imaging surface; and the transparent display is communicatively connected to the microprocessing module to directly display ranging information.

In order to better realize the present disclosure, further, the laser ranging device further includes a projection assembly not disposed coaxially with the beam splitting prism group; the projection assembly includes a projection device and a projection imaging lens, the projection device is communicatively connected to the microprocessing module, and ranging information displayed by the projection device is projected on the visual imaging surface through the projection imaging lens.

In order to better realize the present disclosure, further, a focus lens is provided at any one or more of the transmitting end of the laser transmitter, the receiving end of the laser receiver, and a display end of the projection device.

In order to better realize the present disclosure, further, the ranging assembly is a laser ranging assembly.

Another objective of the present disclosure is to provide an optical module with a structure different from the prior art, to ensure the transmitting optical path coaxial with the receiving optical path through two beam splitting prisms disposed coaxially with an objective lens and an ocular lens. The optical module is suitable for transmitting-receiving coaxial monocular products, such as a gunsight or a monocular ranging telescope.

The present disclosure adopts the following specific technical solutions:

An optical module includes a beam splitting prism group consisting of two beam splitting prisms that are disposed coaxially along a main optical path; one of the beam splitting prisms corresponds to a position of an external laser transmitting end, and refracts and converges into the main optical path, an emitted laser beam, from the laser transmitting end, that is not in the main optical path, and the other one of the beam splitting prism corresponds to a position of an external laser receiving end, and refracts a received laser beam in the main optical path to the laser receiving end that is not in the main optical path.

In order to better realize the present disclosure, further, the beam splitting prism corresponding to a position of a transmitting end of the laser transmitter is denoted as a first beam splitting prism; a working surface, of the first beam splitting prism, that is away from the laser transmitter is an interference reduction surface for reducing reflected laser beams in the prism; and the interference reduction surface is a frosted surface coated with a flat coating, or the interference reduction surface is a highly transmissive surface disposed at an angle.

In order to better realize the present disclosure, further, the optical module further includes a reversing/zoom/focus lens group disposed coaxially with the beam splitting prism group; and the reversing/zoom/focus lens group includes any one of a reversing prism for erecting images, a zoom lens for zooming, a focus lens for focusing, and a reversing and zoom lens for erecting images and zooming. The reversing/zoom/focus lens group is disposed between the objective lens and the beam splitting prism group, the reversing/zoom/focus lens group is disposed between the beam splitting prism group and the ocular lens, or the reversing/zoom/focus lens group is disposed between two beam splitting prisms of the beam splitting prism group.

In order to better realize the present disclosure, further, the reversing prism includes a semi-pentaprism and a roof prism.

In order to better realize the present disclosure, further, beam splitting bevels of the two beam splitting prisms in the beam splitting prism group are disposed in a same direction or in reverse.

In order to better realize the present disclosure, further, the two beam splitting prisms in the beam splitting prism group are arranged separately or glued together as a whole.

The optical module described in the present disclosure can be widely used in the laser ranging devices, for example, a viewing lens, a target lens, a gunsight, a rangefinder, a spectrometer and other similar products.

It should be noted that the "objective lens", "ocular lens", "beam splitting prism", "reversing prism", "zoom lens", "focus prism", "reversing and zoom lens", "focal reducer" used in the present disclosure are all broad concepts that do not refer specifically to a single lens that achieves a specific function, but a module of one or more lenses that can achieve the corresponding function.

Compared with the prior art, the present disclosure has the following advantages and beneficial effects.

(1) In the laser ranging device disclosed in the present disclosure, the laser transmitter and the laser receiver are disposed on a side of the main optical path, without occupying the main optical path, and the beam splitting prisms are used to ensure the transmitting optical path and the receiving optical path coaxial in the main optical path, such that the target can be aimed at more accurately and the distance measurement is more precise.

(2) The laser ranging device of the present disclosure adopts a structure in which the transmitting and receiving optical paths are coaxial in the main optical path. Compared with an optical path structure in which the transmitting and receiving optical paths are not coaxial, the coaxial structure can adopt a conventional objective lens instead of a customized objective lens provided with a notch; further, the complicated aberration correction between the main axis light and the off-axis light is avoided; moreover, it is more conducive to reducing the radial dimension of the whole product.

(3) The laser ranging device disclosed in the present disclosure uses beam splitting prisms for splitting, such that the user can visually observe without a projection device, and can observe the distance between the target viewing lens and the measured object while observing the object image, which has good practicality.

(4) The basic optical components of the optical module disclosed in the present disclosure are only two beam splitting prisms. The structure is extremely simple, but can be applied to a wider range of application scenarios, and has a greater market promotion and application prospects.

(5) The present disclosure has low optical quality loss in the large field of view larger than 2 degrees, and can meet the requirements of products with a field of view of 8 degrees.

REFERENCE NUMERALS

1: laser transmitter; 2: laser receiver; 3, objective lens; 4: ocular lens; 51: first beam splitting prism; 52: second beam splitting prism; 6: reversing/zoom/focus lens group; 61: reversing prism; 62: reversing and zoom lens; 7: focal reducer; 8: projection device; 9: transparent display; 10: visual imaging surface; 11: first image surface; 12: second image surface; 100: interference reduction surface; 200: beam splitting bevel; 300: overall glued surface.

DETAILED DESCRIPTION OF THE EMBODIMENTS

The embodiments of the present disclosure are described below in detail. Examples of the embodiments are shown in the accompanying drawings. The same or similar numerals represent the same or similar elements or elements having the same or similar functions throughout the specification. The embodiments described below with reference to the accompanying drawings are exemplary, are used only for explaining the present disclosure, and should not be construed as a limitation to the present disclosure.

The present disclosure is further described below with reference to FIG. 1 to FIG. 18, but the implementations of the present disclosure are not limited thereto.

Embodiment 1

Figure 1:
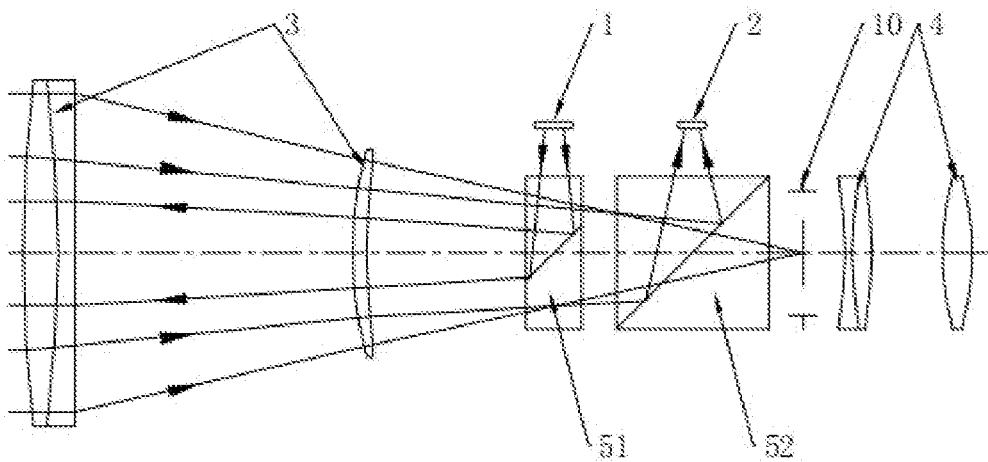
FIG. 1 is a schematic diagram of an optical structure in which only a beam splitting prism group is disposed in a laser ranging device and an objective lens, a transmitter module, a receiver module and an ocular lens are coaxially and sequentially disposed.
Figure 2:
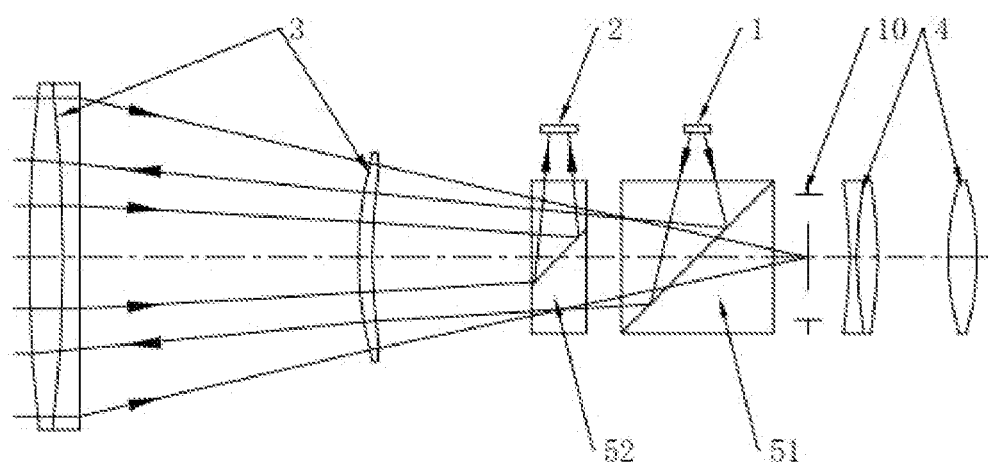
FIG. 2 is a schematic diagram of an optical structure of a laser ranging device in which only a beam splitting prism group is disposed and an objective lens, a receiver module, a transmitter module and an ocular lens are coaxially and sequentially disposed.

This embodiment discloses a group of transmitting-receiving coaxial laser ranging devices. As shown in FIG. 1 and FIG. 2, the transmitting-receiving coaxial laser ranging device includes a lens barrel, and objective lens 3, ocular lens 4, an optical module and a ranging assembly that are mounted on the lens barrel, and the ranging assembly includes laser transmitter 1, laser receiver 2, and a microprocessing module connected to both the laser transmitter 1 and the laser receiver 2. The microprocessing module is not shown in the figures. The optical module is disposed between the objective lens 3 and the ocular lens 4 along the main optical path. The optical module includes a beam splitting prism group, the beam splitting prism group consists of two beam splitting prisms disposed coaxially along the main optical path, and the two beam splitting prisms correspond to positions of the laser transmitter 1 and the laser receiver 2 disposed on a side of the main optical path.

In this embodiment, the beam splitting prism group is the most basic component of the optical module. A laser beam emitted by the laser transmitter 1 is partially refracted by one of the beam splitting prisms and converged into the main optical path and is emitted from the objective lens 3 of the lens barrel, after the emitted laser beam is irradiated on an object surface, a reflected laser beam and an external visible beam enter from an objective lens end of the lens barrel to the other one of the beam splitting prisms along the main optical path, the reflected laser beam is refracted to the laser receiver 2 and received by the laser receiver 2; and the visible beam for imaging is transmitted through the two beam splitting prisms and imaged on visual imaging surface 10 in front of the ocular lens 4.

For the convenience of illustrating the position relationship among the components, a beam splitting prism at the transmitting end of the laser transmitter 1 is denoted as first beam splitting prism 51, and a beam splitting prism group at the receiving end of the laser receiver 2 is denoted as second beam splitting prism 52. The objective lens 3, the ocular lens 4, the first beam splitting prism 51 and the second beam splitting prism 52 are arranged in mainly two ways:

(a) Arrangement mode A1: As shown in FIG. 1, the objective lens 3, the first beam splitting prism 51, the second beam splitting prism 52, and the ocular lens 4 are disposed sequentially and coaxially along the main optical path.

Arrangement mode A2: As shown in FIG. 2, the objective lens 3, the second beam splitting prism 52, the first beam splitting prism 51, and the ocular lens 4 are disposed sequentially and coaxially along the main optical path.

When the arrangement mode A1 is adopted, an emitted laser beam from the laser transmitter 1 is refracted by the first beam splitting prism 51 and then converged into the main optical path, passes the objective lens 3 and is emitted from an objective lens end of the lens barrel; the emitted laser beam is irradiated on the object surface and is reflected, the reflected laser beam and an external visible beam enter from the objective lens 3, and are transmitted through the first beam splitting prism 51 to the second beam splitting prism 52 along the main optical path. At the second beam splitting prism 52, the reflected laser beam is basically refracted to the laser receiver 2 and received by the laser receiver 2, and all the visible light beam for imaging is transmitted and imaged on the visual imaging surface 10 in front of the ocular lens 4.

When the arrangement mode A2 is used, an emitted laser beam from the laser transmitter 1 is refracted by the first beam splitting prism 51 and then converged to the main optical path, passes the second beam splitting prism 52 and the objective lens 3, and then is emitted from an objective lens end of the lens barrel; the emitted laser beam is irradiated on the object surface and is reflected, the reflected laser beam and an external visible beam enter from the objective lens 3 to the second beam splitting prism 52 along the main optical path. In this case, the reflected laser beam is basically refracted to the laser receiver 2 and received by the laser receiver 2, and all the visible light beam for imaging basically passes the second beam splitting prism 52 and the first beam splitting prism 51 and is imaged on the visual imaging surface 10 in front of the ocular lens 4.

In this embodiment, the laser transmitter 1 and the laser receiver 2 are disposed on a side of the main optical path, but the objective lens 3, the ocular lens 4 and the two beam splitting prisms in the optical module are disposed on the main optical path. The beam splitting prisms are used to change optical paths of the emitted beam and the received beam, and the emitted beam and the received beam are ensured to be coaxial on the main optical path, such that the target can be aimed at more accurately and distance measurement is more precise, and the user can visually observe the target through the objective lens 4. Moreover, the coaxial structure can effectively reduce the radial dimension of the whole lens barrel, which is convenient for processing products with smaller size.

Embodiment 2

This embodiment optimizes the structure of the laser ranging device on the basis of Embodiment 1. This embodiment discloses a group of transmitting-receiving coaxial laser ranging devices, including a lens barrel, and objective lens 3, ocular lens 4, an optical module and a ranging assembly that are mounted on the lens barrel, and the ranging assembly includes laser transmitter 1, laser receiver 2, and a microprocessing module connected to both the laser transmitter 1 and the laser receiver 2.

Figure 3:
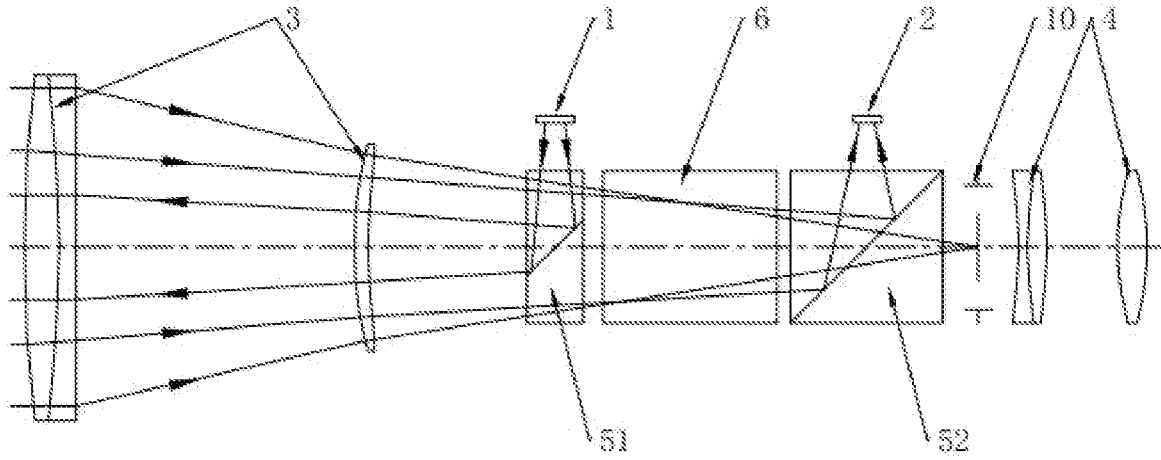
FIG. 3 is a schematic diagram of a first optical structure of a laser ranging device in which a beam splitting prism group and a reversing/zoom/focus lens group are disposed.
Figure 4:
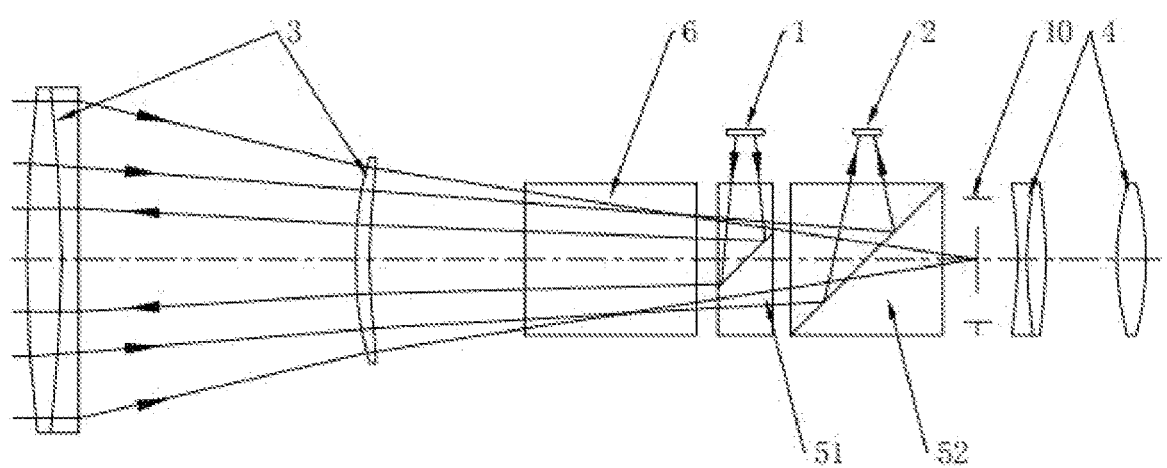
FIG. 4 is a schematic diagram of a second optical structure of a laser ranging device in which a beam splitting prism group and a reversing/zoom/focus lens group are disposed.
Figure 5:
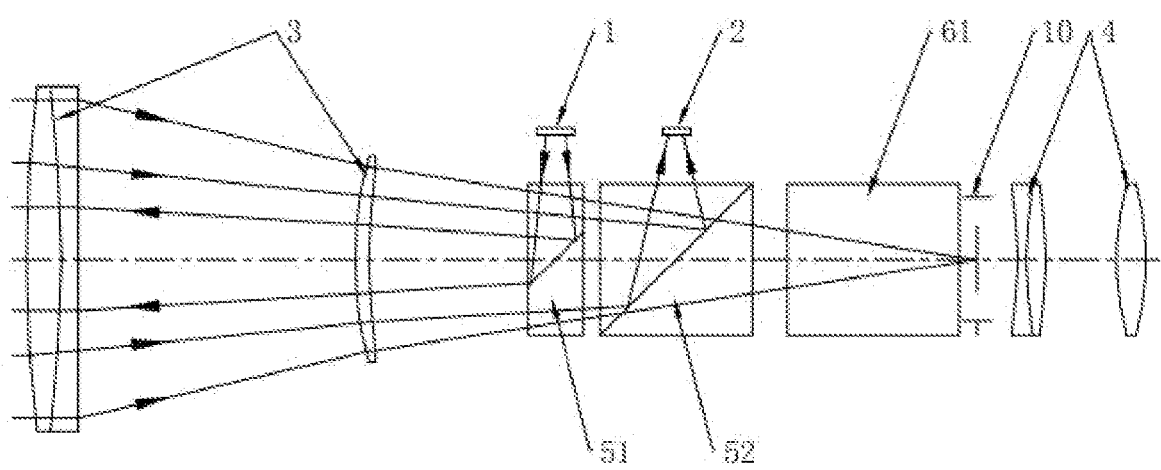
FIG. 5 is a schematic diagram of a third optical structure of a laser ranging device in which a beam splitting prism group and a reversing/zoom/focus lens group are disposed.

As shown in FIG. 3 to FIG. 5, the optical module includes a beam splitting prism group and reversing/zoom/focus lens group 6 that are coaxially disposed. The optical module and the reversing/zoom/focus lens group 6 are disposed between the objective lens 3 and the ocular lens 4 along the main optical path. The beam splitting prism group consists of two beam splitting prisms disposed coaxially along the main optical path, and the two beam splitting prisms correspond to positions of the laser transmitter 1 and the laser receiver 2 that are disposed on a side of the main optical path.

First, reversing prism 61 for erecting images is disposed in addition to the beam splitting prism group.

In Embodiment 1, the beam passes the beam splitting prism group and an inverted image is formed in front of the ocular lens 4. In order to make it more convenient for the user to visually observe the image, it is necessary to optimize the structure for erecting images.

Figure 9:
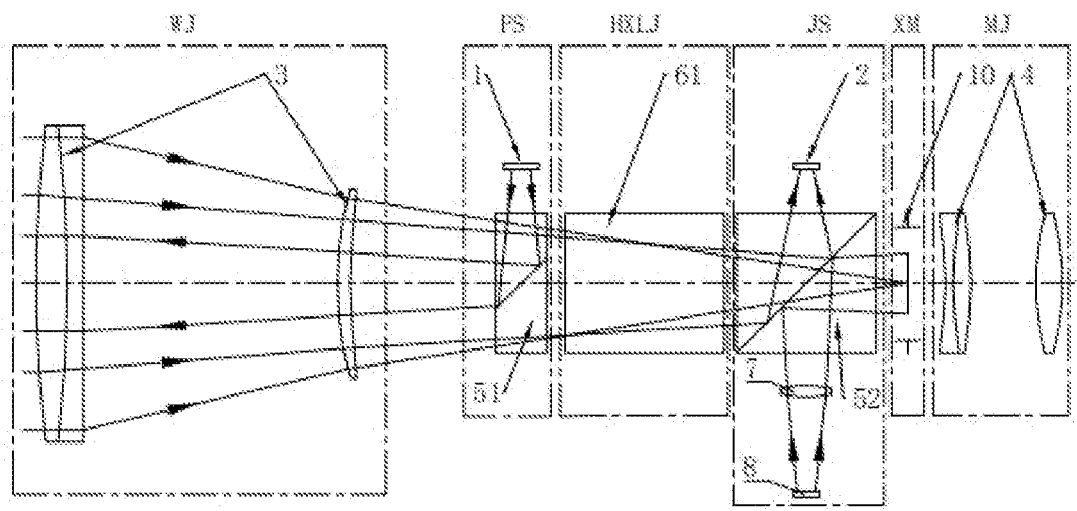
FIG. 9 is a schematic diagram of modules corresponding to optical components when a reversing prism is adopted in Embodiment 2.

As shown in FIG. 9, for example, the reversing/zoom/focus lens group 6 is reversing prism 61. The objective lens 3 is marked as WJ, the ocular lens 4 is marked as MJ, the reversing prism 61 is marked as HXLJ, an emission module is marked as FS, a receiving module is marked as JS, and visual imaging surface 10 is marked as XM. The reversing prism 61, the first beam splitting prism 51, the second beam splitting prism 52, the objective lens 3, and the ocular lens 4 in the optical module are arranged in one of the following ways:

Arrangement mode B1: The objective lens 3, the reversing prism 61, the first beam splitting prism 51, the second beam splitting prism 52, and the ocular lens 4 are disposed sequentially and coaxially along the main optical path, that is, WJ-HXLJ-FS-JS-XM-MJ.

Arrangement mode B2: The objective lens 3, the first beam splitting prism 51, the reversing prism 61, the second beam splitting prism 52, and the ocular lens 4 are disposed sequentially and coaxially along the main optical path, that is, WJ-FS-HXLJ-JS-XM-MJ.

Arrangement mode B3: The objective lens 3, the first beam splitting prism 51, the second beam splitting prism 52, the reversing prism 61, and the ocular lens 4 are disposed sequentially and coaxially along the main optical path, that is, WJ-FS-JS-HXLJ-XM-MJ.

Arrangement mode B4: The objective lens 3, the reversing prism 61, the second beam splitting prism 52, the first beam splitting prism 51, and the ocular lens 4 are disposed sequentially and coaxially along the main optical path, that is, WJ-HXLJ-JS-FS-XM-MJ.

Arrangement mode B5: The objective lens 3, the second beam splitting prism 52, the reversing prism 61, the first beam splitting prism 51, and the ocular lens 4 are disposed sequentially and coaxially along the main optical path, that is, WJ-JS-HXLJ-FS-XM-MJ.

Arrangement B6: The objective lens 3, the second beam splitting prism 52, the first beam splitting prism 51, the reversing prism 61, and the ocular lens 4 are disposed sequentially and coaxially along the main optical path, that is, WJ-JS-FS-HXLJ-XM-MJ.

Further, the reversing prism 61, a proven product for inverting images, can be purchased directly from commercially available products that meet the design requirements. Certainly, the typical structure of the reversing prism 61 includes a semi-pentaprism and a roof prism. The internal optical path of the reversing prism 61 is more complex and reversing images through the prism is very mature, and therefore the accompanying drawings do not show the internal optical path of the reversing prism 61 in detail, but only a simple illustration of the main optical path.

Second, a zoom lens is disposed in addition to the beam splitting prism group.

The zoom lens is used in conjunction with the beam splitting prism group. Compared with similar products, the axial size of this design is smaller. The technology of the zoom lens is mature, and the present disclosure does not aim to improve this. Commercially available products that meet the design requirements can be adopted, and details are not described. The accompanying drawings do not show the internal optical path in detail, but only a simple illustration of the main optical path.

Third, a focus lens is disposed in addition to the beam splitting prism group.

For products with focusing needs, the focus lens is used in conjunction with the beam splitting prism group. The technology of the focus lens is mature, and the present disclosure does not aim to improve this. Commercially available products that meet the design requirements can be adopted, and details are not described. The accompanying drawings do not show the internal optical path in detail, but only a simple illustration of the main optical path.

Fourth, reversing and zoom lens 62 for erecting images and zooming is disposed in addition to the beam splitting prism group.

The reversing and zoom lens 62 for both erecting images and zooming is used in conjunction with the beam splitting prism group. As shown in FIG. 10 and FIG. 6 to FIG. 8, the reversing and zoom lens 62 is used. In this structure, there is inverted first image surface 11XM1 and second image surface 12XM2 after erecting, and the second image surface 12XM2 is the visual imaging surface 10. The reversing and zoom lens 62 is marked as HXBB.

The reversing and zoom lens 62, the first beam splitting prism 51, the second beam splitting prism 52, the objective lens 3, and the ocular lens 4 in the optical module are arranged in one of the following ways:

Arrangement mode C1: The objective lens 3, the reversing and zoom lens 62, the first beam splitting prism 51, the second beam splitting prism 52, and the ocular lens 4 are disposed sequentially and coaxially along the main optical path, that is, WJ-XM1-HXBB-XM2-FS-JS-MJ, WJ-XM1-HXBB-FS-XM2-JS-MJ, or WJ-XM1-HXBB-FS-JS-XM2-MJ.

Arrangement mode C2: The objective lens 3, the first beam splitting prism 51, the reversing and zoom lens 62, the second beam splitting prism 52, and the ocular lens 4 are disposed sequentially and coaxially along the main optical path, that is, WJ-FS-XM1-HXBB-JS-XM2-MJ, WJ-FS-XM1-HXBB-XM2-JS-MJ, or WJ-FS-XM1-HXBB-JS-XM2-MJ.

Arrangement mode C3: The objective lens 3, the first beam splitting prism 51, the second beam splitting prism 52, the reversing and zoom lens 62, and the ocular lens 4 are disposed sequentially and coaxially along the main optical path, that is, WJ-FS-JS-XM1-HXBB-XM2-MJ, WJ-FS-XM1-JS-HXBB-XM2-MJ, or WJ-XM1-FS-JS-HXBB-XM2-MJ.

Arrangement mode C4: The objective lens 3, the reversing and zoom lens 62, the second beam splitting prism 52, the first beam splitting prism 51, and the ocular lens 4 are disposed sequentially and coaxially along the main optical path, that is, WJ-XM1-HXBB-XM2-JS-FS-MJ, WJ-XM1-HXBB-JS-XM2-FS-MJ, or WJ-XM1-HXBB-JS-FS-XM2-MJ.

Arrangement mode C5: The objective lens 3, the second beam splitting prism 52, the reversing and zoom lens 62, the first beam splitting prism 51, and the ocular lens 4 are disposed sequentially and coaxially along the main optical path, that is, WJ-JS-XM1-HXBB-FS-XM2-MJ, WJ-JS-XM1-HXBB-XM2-FS-MJ, or WJ-JS-XM1-HXBB-FS-XM2-MJ.

Arrangement mode C6: The objective lens 3, the second beam splitting prism 52, the first beam splitting prism 51, the reversing and zoom lens 62, and the ocular lens 4 are disposed sequentially and coaxially along the main optical path, that is, WJ-JS-FS-XM1-HXBB-XM2-MJ, WJ-JS-XM1-FS-HXBB-XM2-MJ, or WJ-XM1-JS-FS-HXBB-XM2-MJ.

Figure 6:
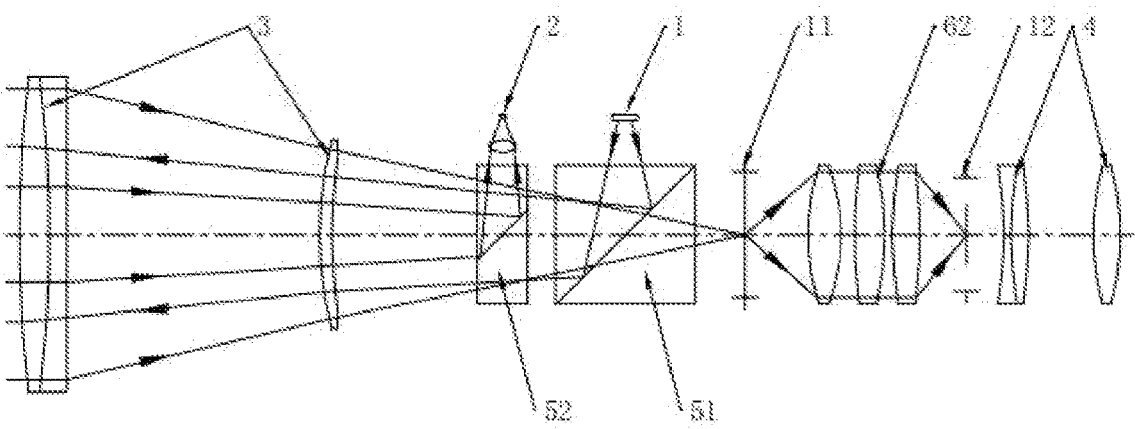
FIG. 6 is a schematic diagram of an optical structure of a first laser ranging device when a reversing and zoom lens is adopted.

Several representative arrangement modes are as follows:

FIG. 6 shows the arrangement mode of WJ-JS-FS-XM1-HXBB-XM2-MJ.

Figure 7:
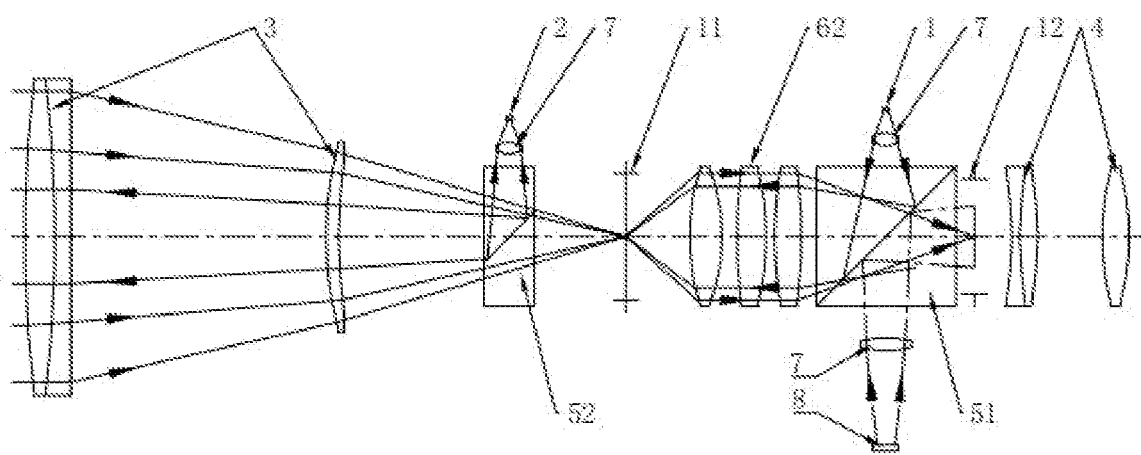
FIG. 7 is a schematic diagram of an optical structure of a second laser ranging device when a reversing and zoom lens is adopted.

FIG. 7 shows the arrangement mode of WJ-JS-XM1-HXBB-FS-XM2-MJ.

Figure 8:
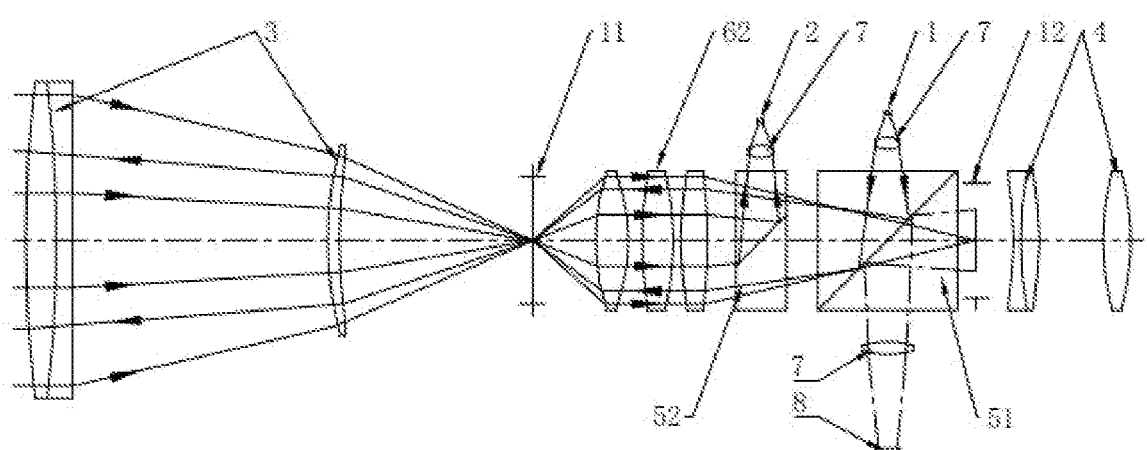
FIG. 8 is a schematic diagram of an optical structure of a third laser ranging device when a reversing and zoom lens is adopted.

FIG. 8 shows the arrangement mode of WJ-XM1-HXBB-JS-FS-XM2-MJ.

The selection of the prisms and the plurality of arrangement modes may be summarized as follows: The reversing/zoom/focus lens group 6 is disposed between the objective lens 3 and the beam splitting prism group, the reversing/zoom/focus lens group 6 is disposed between the beam splitting prism group and the ocular lens 4, or the reversing/zoom/focus lens group 6 is disposed between the two beam splitting prisms in the beam splitting prism group.

Other parts of this embodiment are the same as those of Embodiment 1, and details are not described herein again.

Embodiment 3

This embodiment further optimizes Embodiment 1 or Embodiment 2, to further reduce the size of the laser ranging device. In this case, in this embodiment, focal reducer 7 that can shorten the focal distance is disposed between the laser transmitter 1 and/or the corresponding beam splitting prism. Depending on the actual needs, any of the following three options may be used: The focal reducer 7 for focal reduction is disposed between the transmitting end of the laser transmitter 1 and the first beam splitting prism 51, and no focal reducer 7 is disposed between the receiving end of the laser receiver 2 and the second beam splitting prism 52; or as shown in FIG. 6, no focal reducer 7 is disposed between the transmitting end of the laser transmitter 1 and the first beam splitting prism 51, and the focal reducer 7 for focal reduction is disposed between the receiving end of the laser receiver 2 and the second beam splitting prism 52; or as shown in FIG. 7, and the focal reducer 7 for focal reduction is disposed between the transmitting end of the laser transmitter 1 and the first beam splitting prism 51, and the focal reducer 7 for focal reduction is disposed between the receiving end of the laser receiver 2 and the second beam splitting prism 52. After the focal reducer 7 is disposed, the size of the laser ranging device may be shortened according to the design needs.

Other parts of this embodiment are the same as those of Embodiment 1 or Embodiment 2, and details are not described herein again.

Embodiment 4

This embodiment further optimizes any of Embodiment 1 to Embodiment 3 by coating on the optical lens as designed, to improve the imaging quality.

Coating design 1: Beam splitting bevel 200 of the beam splitting prism is provided with a beam splitting coating through which the visible beam can be transmitted and the laser beam can be transmitted and reflected. Usually, the beam splitting coating is a semi-transmissive and semi-reflective coating, that is, 50% transmission+50% reflection is the maximum power.

Figure 12:
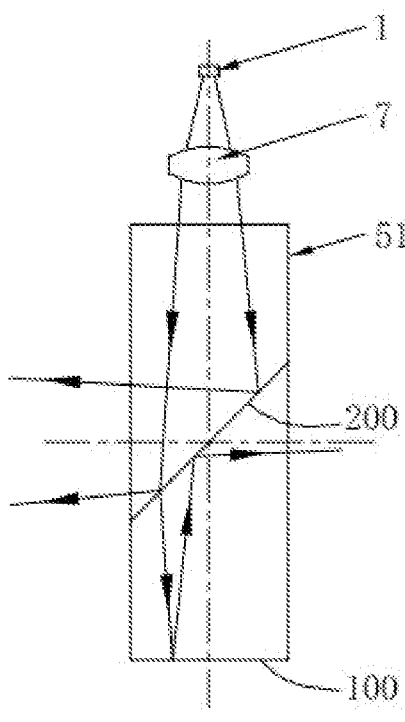
FIG. 12 is a schematic diagram of an optical path of a beam splitting prism with a typical structure in the use state.
Figure 13:
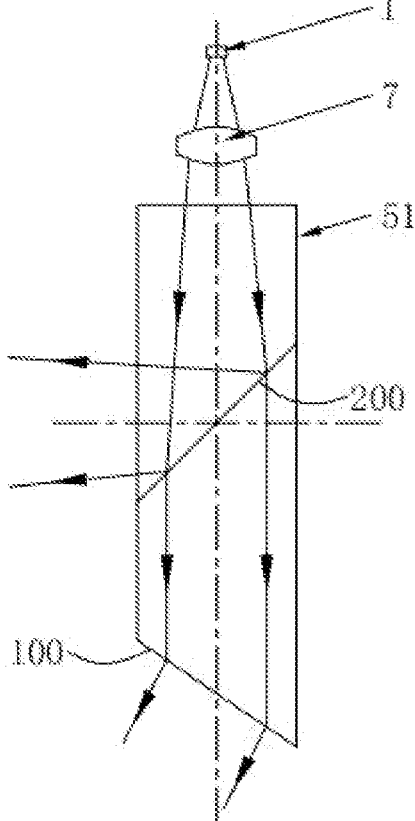
FIG. 13 is a schematic diagram of an optical path of a beam splitting prism with another typical structure in the use state.

Two prism blocks whose bevels are attached together and the incoming and outgoing surfaces are parallel to each other form a beam splitting prism, and a glued surface of the two prism blocks is the beam splitting bevel 200. The structure shown in FIG. 1 and FIG. 2 is used as an example for description. The beam splitting prism consisting of two right-angled prism blocks with bevels attached together is a typical structure, and the glued surface of the two right-angled prism blocks is the beam splitting bevel 200. The coating design 1 further includes three cases. As shown in FIG. 12, the beam splitting prism is formed by two right-angle trapezoidal prisms with bevels attached together. As shown in FIG. 13, on the basis of FIG. 12, one prism block is disposed at an angle away from a surface of the laser transmitter 1, but it is still ensured that the incident beam is emitted towards the main optical path at the beam splitting bevel 200 and the reflected laser beam converges to the main optical path.

In other words, the specific structure of the beam splitting prism is not limited, as long as the beam splitting prism can achieve the function described in this embodiment. As shown in FIG. 12 and FIG. 13, each beam splitting prism that meets the requirements has the beam splitting bevel 200.

Coating Design 1: A bevel of one right-angle prism block is coated with a semi-transmissive and semi-reflective coating and a bevel of the other right-angle prism block is not coated.

Coating design 2: A working surface, of the first beam splitting prism 51, that is away from the laser transmitter 1 is interference reduction surface 100 for reducing reflected laser beams in the prism; and the interference reduction surface 100 is a frosted surface coated with a flat coating.

Coating design 3: A working surface, of the first beam splitting prism 51, away from the laser transmitter 1 is interference reduction surface 100 for reducing reflected laser beams in the prism; and the interference reduction surface 100 is a highly transmissive surface disposed at an angle and provided with an anti-reflection coating.

Coating design 4: The surface of the objective lens 3 is fully multi-coated (FMC).

The coating design 1 provides a semi-transmissive and semi-reflective coating on the beam splitting bevel 200 of the beam splitting prism, that is, the light beam incident on the beam splitting bevel 200 of the beam splitting prism is 50% transmitted and 50% reflected. Certainly, the transmittance/reflectance can be adjusted according to actual needs. Changing the transmittance/reflectance of the beam splitting bevel 200 of the beam splitting prism through coating falls with the prior art and is not an improvement point in the present disclosure, and therefore details are not described.

Coating design 2 and Coating design 3 can reduce the impact of multi-beam interference at the working surface of the beam splitting prism. A solution to reduce beam interference is to design the interference reduction surface 100 as a frosted surface coated with a flat coating. A side of the first beam splitting prism 51 opposite to the emission direction of the laser transmitter 1 is denoted as the interference reduction surface 100. As shown in FIG. 13, frosting treatment may be performed on the interference reduction surface 100 to form a frosted surface, which can reduce the reflectance to less than 5%. In addition, the frosted surface may coated with a flat coating, which can absorb as much light as possible.

Through the above matting process, the laser beam transmitted the beam splitting bevel 200 and reflected to the beam splitting prism through the interference reduction surface 100 can be reduced to less than one thousandth of the laser beam. When the beam reflected to the beam splitting prism is split to 50%, the proportion of the laser energy reflected to the laser receiver 2 to the laser beam is less than 0.0005. This energy is basically less than the natural laser, thereby reducing interference.

Further, another solution to reduce beam interference is to design the interference reduction surface 100 as a highly transmissive surface disposed at an angle. As shown in FIG. 13, the laser light escapes from the tilted highly transmissive surface.

Further, the interference reduction surface 100 of the beam splitting prism may alternatively be left untreated, and interference from the reflected laser signal may be excluded through a special design of the operator circuit. This falls within the prior art and is only one of the preferred solution of this embodiment rather than an improvement point of this embodiment, and therefore details are not described.

Coating design 4 is to coat the FMC coating on the objective lens 3. The FMC coating is known as a fully multi-coated coating. Multiple layers of reflective reduction and transmission enhancement coatings are coated on a surface, of the objective lens 3, that is in contact with the air, to reduce reflections, increase light transmission, such that products such as the laser ranging device have a brighter field of view, and good control of flare and ghosting.

Other parts of this embodiment are the same as those of any one of Embodiment 1 to Embodiment 3, and details are not described herein again.

Embodiment 5

Figure 11:
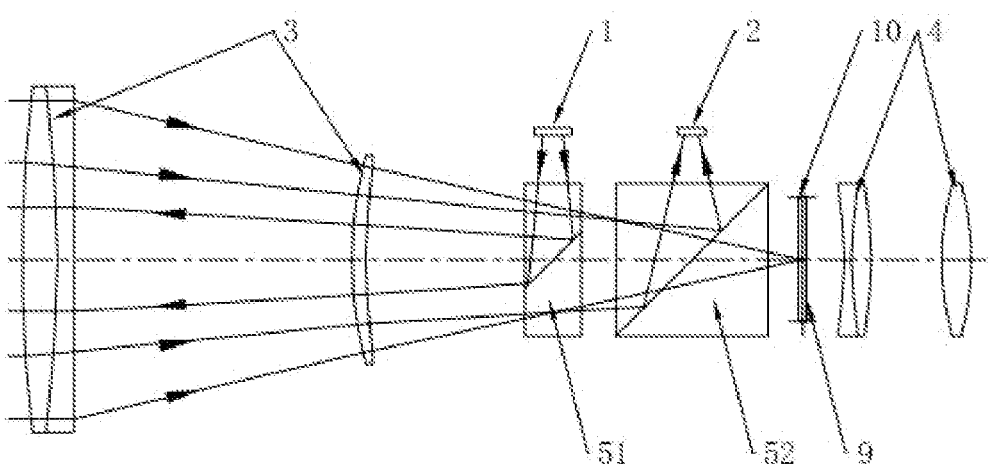
FIG. 11 is a schematic diagram of an optical structure of a laser ranging device when a transparent display adopted.

The laser ranging devices described in Embodiment 1 to Embodiment 4 can be visually observed. This embodiment makes further optimization on the basis of any one of Embodiment 1 to Embodiment 4. As shown in FIG. 11, the laser ranging device further includes a transparent display 9 disposed coaxially with the beam splitting prism group, and the transparent display 9 is located on the visual imaging surface 10; the transparent display 9 is communicatively connected to the microprocessing module to directly display ranging information.

Usually, the transparent display 9 in the working state can display the physical object and display information at the same time. The user can view, through the ocular lens 4, both the ranging information and product parameter information of the laser ranging device in the information display area, and the image on the visual imaging surface 10 in the physical observation area.

Other parts of this embodiment are the same as those of any one of Embodiment 1 to Embodiment 4, and details are not described herein again.

Embodiment 6

The laser ranging devices described in Embodiment 1 to Embodiment 4 can be visually observed. This embodiment makes further optimization on the basis of any one of Embodiment 1 to Embodiment 4. The laser ranging device further includes a projection assembly not disposed coaxially with the beam splitting prism group; the projection assembly includes projection device 8 and a projection imaging lens, the projection device 8 is communicatively connected to the microprocessing module, and the ranging information displayed by the projection device 8 is projected by the projection imaging lens and refracted by the beam splitting prism, to be displayed on the visual imaging surface 10.

The projection assembly is disposed corresponding to the position of either of the two beam splitting prisms, specifically, the projection device 8 projects an image through an projection imaging lens, and the beam splitting bevel 200 of the beam splitting prism reflects the projected image to the visual imaging surface 10, which facilitates the user to view the image projection through the ocular lens 4.

Figure 10:
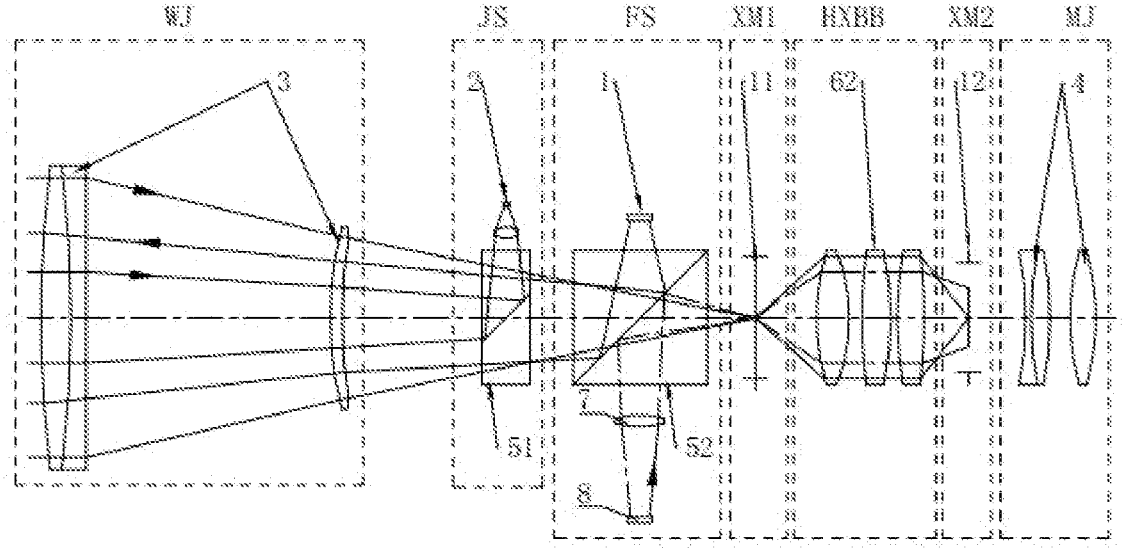
FIG. 10 is a schematic diagram of modules corresponding to optical components when a reversing and zoom lens is adopted in Embodiment 2.

As shown in FIG. 8 and FIG. 10, the projection device 8 corresponds to the position of the first beam splitting prism 51. In this case, the projection assembly shares a beam splitting prism with the laser transmitter 1.

In this case, in the working state, the visible beam is imaged on the visual imaging surface 10 in front of the ocular lens 4. The projection device 8 faces the beam splitting bevel 200 of the first beam splitting prism 51, and the projected image sent by the projection device 8 is also reflected by the beam splitting bevel 200 of the first beam splitting prism 51 to the visual imaging surface 10 in front of the ocular lens 4.

As shown in FIG. 9, the projection device 8 corresponds to the position of the second beam splitting prism 52. In this case, the projection assembly shares a beam splitting prism with the laser receiver 2.

In this case, in the working state, the visible beam is imaged on the visual imaging surface 10 in front of the ocular lens 4. The projection device 8 faces the beam splitting bevel 200 of the second beam splitting prism 52, and the projected image sent by the projection device 8 is also reflected by the beam splitting bevel 200 of the second beam splitting prism 52 to the visual imaging surface 10 in front of the ocular lens 4.

Further, the projection device 8 is a display for projecting any one or more information such as scales, measurement parameters, measured distances onto the beam splitting bevel 200 of the beam splitting prism. The information displayed by the display is imaged on the visual imaging surface 10 in front of the ocular lens 4 after refraction. In this case, the user can observe, through the ocular lens 4, both the target or the to-be-measured object, and the information projected on the display.

Further, the projection imaging lens may be any one of a projection lens or a projection reflector. When a projection lens is used, the projection information displayed by the projection device 8 is projected through the projection lens to the corresponding beam splitting prism. In this case, the projection direction of the projection device 8 is directed towards the corresponding beam splitting prism. When a projection reflector is used, the projection information displayed by the projection device 8 is reflected by the projection reflector to the corresponding beam splitting prism. In this case, the projection direction of the projection device 8 is not limited to the direction of the corresponding beam splitting prism. In other words, the projection device 8 can be installed in a more flexible position when this structure is designed.

Further, the projection imaging lens includes both a projection lens and a projection reflector. The projection information displayed by the projection device 8 first passes through the projection lens and then reflected by the projection lens to the corresponding beam splitting prism.

When the projection imaging lens includes a projection reflector, a typical structure is that the projection direction of the projection device 8 is parallel to the main optical path and the projection reflector disposed at an angle of 45° emits the projection to the corresponding beam splitting prism.

Other parts of this embodiment are the same as those of any one of Embodiment 1 to Embodiment 4, and details are not described herein again.

Embodiment 7

This embodiment provides a transmitting-receiving coaxial laser ranging device, and the optical module has a structure as described in any one of Embodiments 1 to 6. Specifically, the optical module includes a beam splitting prism group consisting of two beam splitting prisms that are disposed coaxially along a main optical path; one of the beam splitting prisms corresponds to a position of an external laser transmitting end, and refracts and converges into the main optical path, an emitted laser beam, from the laser transmitting end, that is not in the main optical path, and the other one of the beam splitting prisms corresponds to a position of an external laser receiving end, and refracts a received laser beam in the main optical path to the laser receiving end that is not in the main optical path.

The optical module in this embodiment is mainly used for transmitting-receiving coaxial monocular products, such as a gunsight, a bird watching lens or a laser rangefinder.

Further, the beam splitting prism includes beam splitting bevel 200 formed by gluing two bevels together, one of which is coated with a semi-transmissive and semi-reflective coating and the other one is uncoated.

Further, the beam splitting prism corresponding to the position of the laser emitting end is denoted as first beam splitting prism 51; a working surface, of the first beam splitting prism 51, that is away from laser transmitter 1 is interference reduction surface 100 for reducing reflected laser beams in the prism; and the interference reduction surface 100 is a frosted surface coated with a flat coating, or the interference reduction surface 100 is a highly transmissive surface disposed at an angle and provided with an anti-reflection coating.

Further, the optical module further includes reversing/zoom/focus lens group 6 disposed coaxially with the beam splitting prism group; and the reversing/zoom/focus lens group 6 includes any one of reversing prism 61 for erecting images, a zoom lens for zooming, a focus lens for focusing, and reversing and zoom lens 62 for erecting images and zooming; the reversing/zoom/focus lens group 6 is disposed between objective lens 3 and the beam splitting prism group, the reversing/zoom/focus lens group 6 is disposed between the beam splitting prism group and ocular lens 4, or the reversing/zoom/focus lens group 6 is disposed between two beam splitting prisms of the beam splitting prism group.

Figure 14:
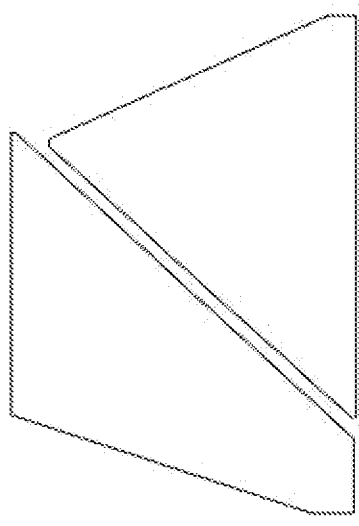
FIG. 14 is a schematic structural diagram of a reversing prism with a typical structure.
Figure 15:
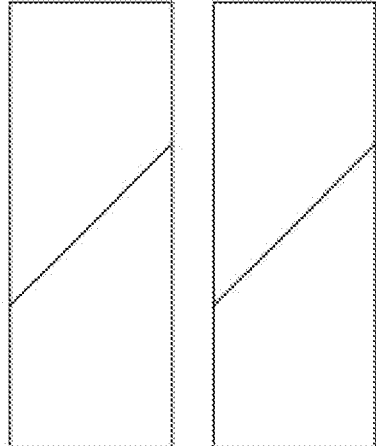
FIG. 15 is a schematic structural diagram of a beam splitting prism group in which two beam splitting prisms are arranged separately and beam splitting bevels are arranged in a same direction.
Figure 16:
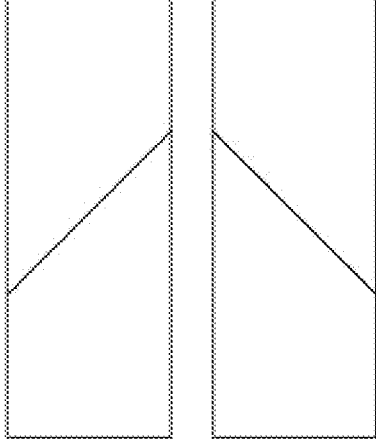
FIG. 16 is a schematic structural diagram of a beam splitting prism group in which two beam splitting prisms are arranged separately and beam splitting bevels are arranged in reverse.
Figures 17, 18:
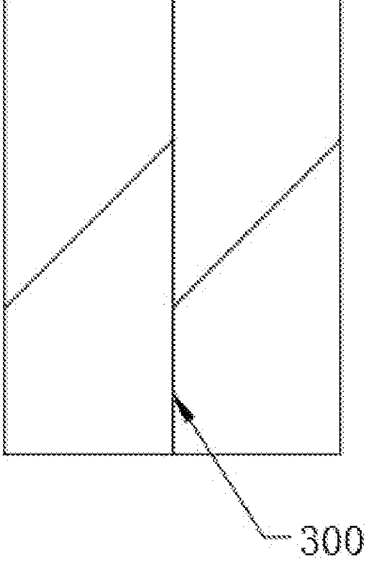
FIG. 17 is a schematic structural diagram of a beam splitting prism group in which two beam splitting prisms are glued together as a whole and beam splitting bevels are arranged in a same direction.
FIG. 18 is a schematic structural diagram of a beam splitting prism group in which two beam splitting prisms are glued together as a whole and beam splitting bevels are arranged in reverse.

Further, as shown in FIG. 14, the reversing prism 61 includes a semi-pentaprism and a roof prism. Certainly, other reversing prisms such as Abbe prisms may be used as the reversing prism 61 in this embodiment. The technology of the reversing prism is mature, and the present disclosure does not aim to improve this. Commercially available products that meet the design requirements can be adopted, and details are not described. The accompanying drawings do not show the internal optical path in detail, but only a simple illustration of the main optical path.

Further, the objective lens 3 is provided with an FMC coating.

Further, as shown in FIG. 15 to FIG. 18, the beam splitting bevels 200 of the two beam splitting prisms in the beam splitting prism group are disposed in a same direction or in reverse.

Further, as shown in FIG. 15 to FIG. 18, the two beam splitting prisms in the beam splitting prism group are arranged separately or glued together as a whole. When the two beam splitting prisms are glued together as a whole, an overall glued surface 300 is formed.

The above description is only the preferred embodiments of the present disclosure and is not intended to limit the present disclosure in any form. Any simple modifications and equivalent changes and modifications made to the above embodiments according to the technical essence of the present disclosure fall within the scope of the technical solution of the present disclosure.

What is claimed is:

1. A transmitting-receiving coaxial laser ranging device, comprising a lens barrel, and an objective lens, an ocular lens, an optical module and a ranging assembly, wherein the objective lens, the ocular lens, the optical module and the ranging assembly are mounted on the lens barrel, wherein the ranging assembly comprises a laser transmitter, a laser receiver, and a microprocessing module, wherein the microprocessing module is connected to the laser transmitter and the laser receiver;

the optical module is disposed between the objective lens and the ocular lens along a main optical path and comprises a beam splitting prism group, the beam splitting prism group consists of two beam splitting prisms disposed coaxially along the main optical path, and the two beam splitting prisms respectively correspond to positions of the laser transmitter and the laser receiver, wherein the laser transmitter and the laser receiver are disposed on a side of the main optical path; and a laser beam emitted by the laser transmitter is partially refracted by a first one of the two beam splitting prisms and converged into the main optical path and is emitted from the objective lens of the lens barrel, after the laser beam is irradiated on an object surface, a reflected laser beam and an external visible beam enter from an objective lens end of the lens barrel to a second one of the two beam splitting prisms along the main optical path, and the reflected laser beam is refracted to the laser receiver and received by the laser receiver; and the external visible beam for imaging is transmitted through the two beam splitting prisms and imaged on a visual imaging surface in front of the ocular lens, wherein a beam splitting bevel of a first beam splitting prism is provided with a beam splitting coating, wherein the external visible beam is allowed to be transmitted through the beam splitting coating and the laser beam is allowed to be transmitted and reflected through the beam splitting coating;

the beam splitting prism disposed at a transmitting end of the laser transmitter is denoted as the first beam splitting prism, and the beam splitting prism disposed at a receiving end of the laser receiver is denoted as a second beam splitting prism; and the objective lens, the first beam splitting prism, the second beam splitting prism, and the ocular lens are sequentially and coaxially disposed along the main optical path, or the objective lens, the second beam splitting prism, the first beam splitting prism, and the ocular lens are sequentially and coaxially disposed along the main optical path.

2. The transmitting-receiving coaxial laser ranging device according to claim 1, wherein the beam splitting coating is a semi-transmissive and semi-reflective coating.

3. The transmitting-receiving coaxial laser ranging device according to claim 1, wherein a working surface of the first beam splitting prism is an interference reduction surface for reducing reflected laser beams in the prism, wherein the working surface is away from the laser transmitter; and the interference reduction surface is a frosted surface coated with a flat coating, or the interference reduction surface is a highly transmissive surface disposed at an angle.

4. The transmitting-receiving coaxial laser ranging device according to claim 1, wherein the optical module further comprises a reversing/zoom/focus lens group disposed coaxially with the beam splitting prism group; and the reversing/zoom/focus lens group comprises any one of a reversing prism for erecting images, a zoom lens for zooming, a focus lens for focusing, and a reversing and zoom lens for erecting images and zooming; and the reversing/zoom/focus lens group is disposed between the objective lens and the beam splitting prism group, the reversing/zoom/focus lens group is disposed between the beam splitting prism group and the ocular lens, or the reversing/zoom/focus lens group is disposed between the two beam splitting prisms of the beam splitting prism group.

5. The transmitting-receiving coaxial laser ranging device according to claim 1, wherein the transmitting-receiving coaxial laser ranging device further comprises a transparent display disposed coaxially with the beam splitting prism group, and the transparent display is located on the visual imaging surface; and the transparent display is communicatively connected to the microprocessing module to directly display ranging information.

6. The transmitting-receiving coaxial laser ranging device according to claim 1, wherein the transmitting-receiving coaxial laser ranging device further comprises a projection assembly not disposed coaxially with the beam splitting prism group;

the projection assembly comprises a projection device and a projection imaging lens, the projection device is communicatively connected to the microprocessing module, and ranging information displayed by the projection device passes the projection imaging lens and is refracted by the beam splitting prism and imaged on the visual imaging surface.

7. The transmitting-receiving coaxial laser ranging device according to claim 6, wherein a focus lens is provided at any one or more of a transmitting end of the laser transmitter, a receiving end of the laser receiver, and a display end of the projection device.

8. An optical module for a transmitting-receiving coaxial laser ranging device, wherein the optical module comprises a beam splitting prism group consisting of two beam splitting prisms, wherein the two beam splitting prisms are disposed coaxially along a main optical path;

a first one of the two beam splitting prisms corresponds to a position of an external laser transmitting end, and refracts and converges an emitted laser beam into the main optical path from the external laser transmitting end, wherein the emitted laser beam is not in the main optical path, and a second one of the two beam splitting prisms corresponds to a position of an external laser receiving end, and refracts a received laser beam in the main optical path to the external laser receiving end, wherein the external laser receiving end is not in the main optical path, wherein the beam splitting prism corresponding to the position of the external laser transmitting end is denoted as the first beam splitting prism;

a working surface of the first beam splitting prism is an interference reduction surface for reducing reflected laser beams in the prism, wherein the working surface is away from the laser transmitter; and the interference reduction surface is a frosted surface coated with a flat coating, or the interference reduction surface is a highly transmissive surface disposed at an angle.

9. The optical module according to claim 8, wherein the optical module further comprises a reversing/zoom/focus lens group disposed coaxially with the beam splitting prism group; and the reversing/zoom/focus lens group comprises any one of a reversing prism for erecting images, a zoom lens for zooming, a focus lens for focusing, and a reversing and zoom lens for erecting images and zooming; and the reversing/zoom/focus lens group is disposed between the objective lens and the beam splitting prism group, the reversing/zoom/focus lens group is disposed between the beam splitting prism group and the ocular lens, or the reversing/zoom/focus lens group is disposed between the two beam splitting prisms of the beam splitting prism group.

10. The optical module according to claim 9, wherein the reversing prism comprises a semi-pentaprism and a roof prism.

11. The optical module according to claim 10, wherein beam splitting bevels of the two beam splitting prisms in the beam splitting prism group are disposed in a same direction or in reverse.

12. The optical module according to claim 9, wherein beam splitting bevels of the two beam splitting prisms in the beam splitting prism group are disposed in a same direction or in reverse.

13. The optical module according to claim 9, wherein the two beam splitting prisms in the beam splitting prism group are arranged separately or glued together as a whole.

14. The optical module according to claim 8, wherein beam splitting bevels of the two beam splitting prisms in the beam splitting prism group are disposed in a same direction or in reverse.

15. The optical module according to claim 8, wherein the two beam splitting prisms in the beam splitting prism group are arranged separately or glued together as a whole.

* * * * *